US012572433B2

(12) United States Patent
Doddi et al.

(10) Patent No.: US 12,572,433 B2
(45) Date of Patent: Mar. 10, 2026

(54) DYNAMICALLY RECONFIGURED REDUNDANT LANES IN A COMMUNICATION INTERFACE CIRCUIT BETWEEN CHIPLETS TO INCREASE REDUNDANCY WHEN THE PROBABILITY OF FAILURE FAVORS A PARTICULAR COMMUNICATION DIRECTION

(71) Applicant: QUALCOMM Incorporated, San Diego, CA (US)

(72) Inventors: Ravindranath Doddi, Hyderabad (IN); Ramacharan Sundararaman, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 111 days.

(21) Appl. No.: 18/782,741

(22) Filed: Jul. 24, 2024

(65) Prior Publication Data

US 2026/0030122 A1 Jan. 29, 2026

(51) Int. Cl.
*G06F 11/00* (2006.01)
*G06F 11/20* (2006.01)

(52) U.S. Cl.
CPC .... *G06F 11/2002* (2013.01); *G06F 2201/805* (2013.01)

(58) Field of Classification Search
CPC .................................................. G06F 11/2002
See application file for complete search history.

(56) References Cited

U.S. PATENT DOCUMENTS

| | | | |
|---|---|---|---|
| 4,751,656 A | 6/1988 | Conti et al. | |
| 2005/0276150 A1* | 12/2005 | Vogt | G11C 7/222 |
| | | | 365/210.1 |
| 2006/0004953 A1* | 1/2006 | Vogt | G06F 13/1684 |
| | | | 711/105 |
| 2010/0005335 A1 | 1/2010 | Ferraiolo et al. | |
| 2010/0083066 A1* | 4/2010 | Sivaramakrishnan | |
| | | | H04L 1/0006 |
| | | | 710/110 |
| 2012/0151247 A1 | 6/2012 | Ferraiolo et al. | |
| 2015/0278040 A1* | 10/2015 | Sikkink | G06F 13/4022 |
| | | | 714/5.1 |

(Continued)

OTHER PUBLICATIONS

International Search Report and Written Opinion for International Patent Application No. PCT/US2025/032019, mailed Sep. 12, 2025, 15 pages.

(Continued)

*Primary Examiner* — Joshua P Lottich
(74) *Attorney, Agent, or Firm* — Withrow & Terranova, PLLC

(57) ABSTRACT

An integrated circuit (IC) package including a first chiplet, a second chiplet, and a communication interface circuit coupling the first and second chiplets is disclosed. The communication interface circuit comprises main lanes wherein a first portion of which communicates information from the first chiplet to the second chiplet (i.e., first direction) and wherein a second portion of which communicates information from the second chiplet to the first chiplet (i.e., second direction). The communication interface circuit also comprises a plurality of redundant lanes wherein each of the redundant lanes are dynamically configurable to communicate in one of a first and a second direction.

22 Claims, 9 Drawing Sheets

(56)        References Cited

U.S. PATENT DOCUMENTS

| | | | |
|---|---|---|---|
| 2016/0085653 A1 * | 3/2016 | Li ....................... | G06F 11/1076 |
| | | | 714/6.3 |
| 2019/0042524 A1 * | 2/2019 | Das Sharma ....... | G06F 13/4282 |
| 2020/0319957 A1 | 10/2020 | Iyer et al. | |
| 2023/0318701 A1 * | 10/2023 | Hashemi ............ | H04J 14/0307 |
| | | | 398/5 |

OTHER PUBLICATIONS

Mutschler, A., "Automotive Relationships Shifting With Chiplets," Seminconductor Engineering, May 24, 2023, available online: [URL: https://semiengineering.com/automotive-relationships-shifting-with-chiplets/], 9 pages.

* cited by examiner

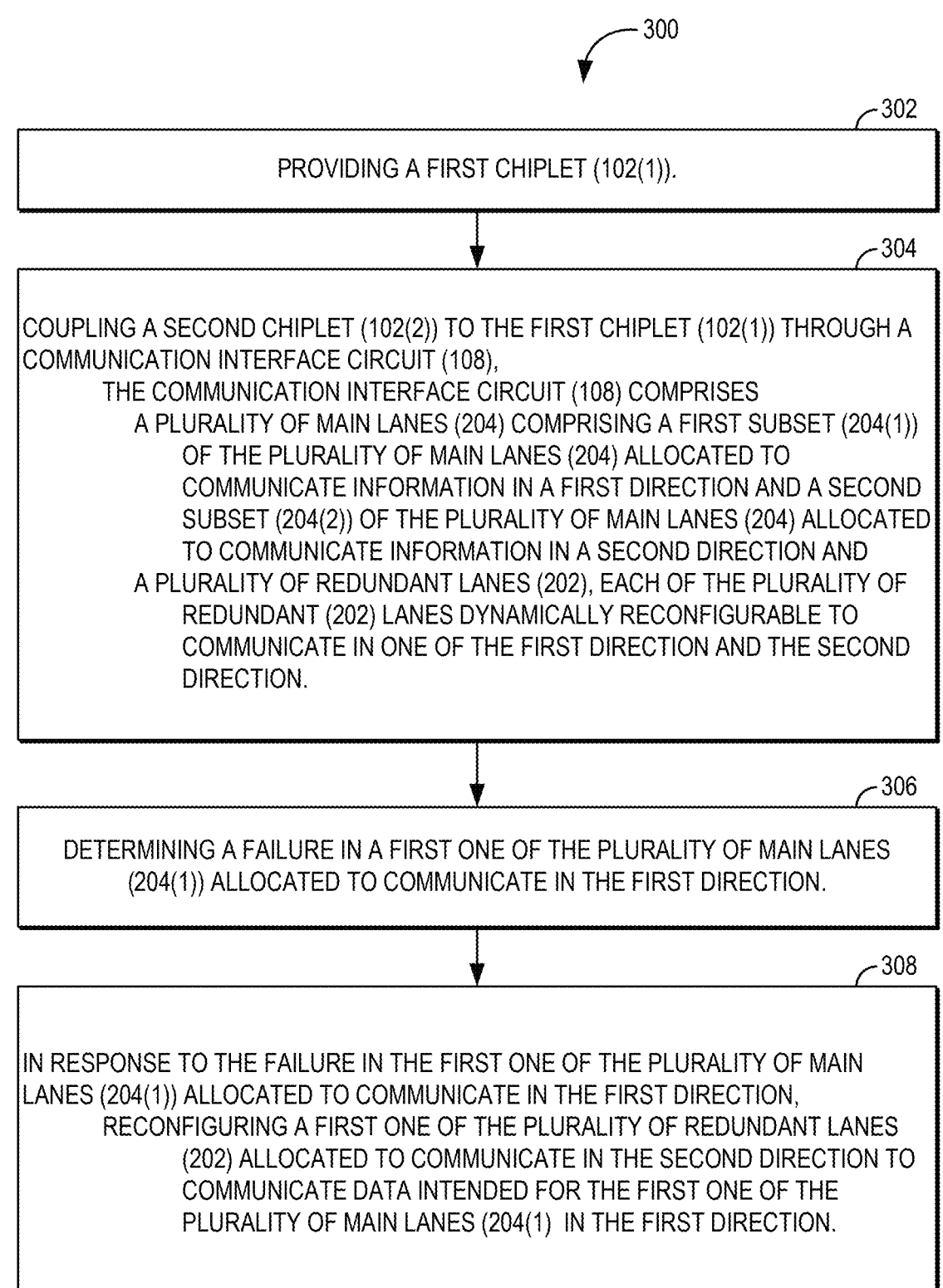

─300

┌─302
PROVIDING A FIRST CHIPLET (102(1)).

┌─304
COUPLING A SECOND CHIPLET (102(2)) TO THE FIRST CHIPLET (102(1)) THROUGH A COMMUNICATION INTERFACE CIRCUIT (108),
THE COMMUNICATION INTERFACE CIRCUIT (108) COMPRISES
A PLURALITY OF MAIN LANES (204) COMPRISING A FIRST SUBSET (204(1)) OF THE PLURALITY OF MAIN LANES (204) ALLOCATED TO COMMUNICATE INFORMATION IN A FIRST DIRECTION AND A SECOND SUBSET (204(2)) OF THE PLURALITY OF MAIN LANES (204) ALLOCATED TO COMMUNICATE INFORMATION IN A SECOND DIRECTION AND
A PLURALITY OF REDUNDANT LANES (202), EACH OF THE PLURALITY OF REDUNDANT (202) LANES DYNAMICALLY RECONFIGURABLE TO COMMUNICATE IN ONE OF THE FIRST DIRECTION AND THE SECOND DIRECTION.

┌─306
DETERMINING A FAILURE IN A FIRST ONE OF THE PLURALITY OF MAIN LANES (204(1)) ALLOCATED TO COMMUNICATE IN THE FIRST DIRECTION.

┌─308
IN RESPONSE TO THE FAILURE IN THE FIRST ONE OF THE PLURALITY OF MAIN LANES (204(1)) ALLOCATED TO COMMUNICATE IN THE FIRST DIRECTION, RECONFIGURING A FIRST ONE OF THE PLURALITY OF REDUNDANT LANES (202) ALLOCATED TO COMMUNICATE IN THE SECOND DIRECTION TO COMMUNICATE DATA INTENDED FOR THE FIRST ONE OF THE PLURALITY OF MAIN LANES (204(1)  IN THE FIRST DIRECTION.

FIG. 3

DYNAMICALLY RECONFIGURED REDUNDANT LANES IN A COMMUNICATION INTERFACE CIRCUIT BETWEEN CHIPLETS TO INCREASE REDUNDANCY WHEN THE PROBABILITY OF FAILURE FAVORS A PARTICULAR COMMUNICATION DIRECTION

TECHNICAL FIELD

The technology of the disclosure relates to communication interfaces between integrated circuits, and, in particular, to configuration of redundant lanes in a communication interface between chiplets.

BACKGROUND

Integrated circuits (ICs) are the cornerstone of electronic devices. ICs are packaged in an IC package, also called a "semiconductor package" or "chip package." The IC package includes one or more semiconductor dice ("dies" or "dice") as an IC(s) that is mounted on and electrically coupled to a package substrate to provide physical support and an electrical interface to the die(s). The package substrate also includes one or more metallization layers that include metal interconnects (e.g., metal traces, metal lines) with vertical interconnect accesses (vias) coupling the metal interconnects together between adjacent metallization layers to provide electrical interfaces between the die(s).

Chiplet technology, also known as chiplet design, is a modular approach to building complex electronic systems. It involves creating small, self-contained dies called "chiplets," each chiplet dedicated to a specific function as opposed to system-on-chip (SoC) designs which include many complex functions on a single die. Chiplets generally have smaller die areas than SoCs and can then be combined and interconnected to form larger and more complex systems tailored to unique requirements. Combined chiplets are deployed in a single IC package. One of the key advantages of chiplet technology includes flexibility and scalability. By assembling different chiplets, products can be optimized for specific performance and power needs, enabling more streamlined and cost-efficient manufacturing processes. While chiplet technology offers numerous advantages, it also introduces reliability concerns, as the interconnection of multiple chiplets may increase the risk of failure compared to monolithic designs.

SUMMARY OF THE DISCLOSURE

Aspects disclosed in the detailed description include dynamically reconfigured redundant lanes in a communication interface circuit between chiplets to increase redundancy when the probability of failure favors a particular communication direction. Related apparatus and methods are also disclosed. In this regard, in some exemplary aspects disclosed herein, an integrated circuit (IC) package includes a processor-based system including a first chiplet, a second chiplet, and a communication interface circuit coupling the first and second chiplets. The communication interface circuit comprises main lanes (i.e., data lanes), also referred to as a main band, wherein a first portion of which communicates information from the first chiplet to the second chiplet (i.e., a first direction) and wherein a second portion of which communicates information from the second chiplet to the first chiplet (i.e., a second direction). The communication interface circuit also comprises a plurality of redundant lanes wherein each of the redundant lanes is dynamically configurable to communicate in one of the first and second directions. The communication interface circuit is configured to determine a failure in one of the main lanes which is allocated to communicate data in the first direction. In response to the failure in the one of the main lanes allocated to communicate data in the first direction, the communication interface circuit is configured to reconfigure one of the plurality of redundant lanes to communicate data intended for the one of the plurality of main lanes in the first direction.

In this regard, by dynamically reconfiguring a redundant lane to communicate in one of the first and second directions, the processor-based system can provide increased redundancy without changing the fixed number of redundant lanes when a probability of failure favors a particular communication direction. The probability of failure favors a particular communication direction when workloads running on the chiplets favor communication flow in the same particular direction. For example, one chiplet is a processing unit and the other chiplet is an accelerator, and the workload running on these chiplets favors the flow of information from the accelerator to the processing unit. As such, the probability of failure of the main band lanes in the direction from the accelerator to the processing unit is greater than the probability of failure of the main band lanes in the direction from the processing unit to the accelerator. Correspondingly, more than half of the redundant lanes including all the redundant lanes can be reconfigured to support the errors in the main lanes which were intended to communicate between the accelerator and the processing unit as errors in the main lanes occur.

In one aspect, an integrated circuit (IC) package is provided. The IC package comprises a communication interface circuit, a first chiplet, and a second chiplet coupled to the first chiplet through the communication interface circuit. The communication interface circuit comprises a plurality of main lanes comprising a first subset of the plurality of main lanes allocated to communicate information in a first direction and a second subset of the plurality of main lanes allocated to communicate information in a second direction and a plurality of redundant lanes, each of the plurality of redundant lanes dynamically reconfigurable to communicate in one of the first direction and the second direction. The communication interface circuit is configured to determine a failure in a first one of the plurality of main lanes allocated to communicate in the first direction and, in response to the failure in the first one of the plurality of main lanes allocated to communicate in the first direction, the communication interface circuit is further configured to reconfigure a first one of the plurality of redundant lanes allocated to communicate in the second direction to communicate data intended for the first one of the plurality of main lanes in the first direction.

In another aspect, a method of communicating between two chiplets in an integrated circuit (IC) package is provided. The method comprises coupling a first chiplet to a second chiplet through a communication interface circuit. The communication interface circuit comprises a plurality of main lanes comprising a first subset of the plurality of main lanes allocated to communicate information in a first direction and a second subset of the plurality of main lanes allocated to communicate information in a second direction and a plurality of redundant lanes, each of the plurality of redundant lanes dynamically reconfigurable to communicate in one of the first direction and the second direction. The method further comprises determining a failure in a first one of the plurality of main lanes allocated to communicate in the first direction and, in response to the failure in the first one of the plurality of main lanes allocated to communicate in the first direction, reconfiguring a first one of the plurality of redundant lanes allocated to communicate in the second direction to communicate data intended for the first one of the plurality of main lanes in the first direction.

BRIEF DESCRIPTION OF THE FIGURES

FIG. 3 is a flowchart illustrating an exemplary process of dynamically reconfiguring redundant lanes in a communication interface circuit between two chiplets to increase redundancy when the probability of failure favors a particular communication direction including, but not limited to, the chiplets and communication interface circuit in FIGS. 1 and 2;

DETAILED DESCRIPTION

Figure 1:
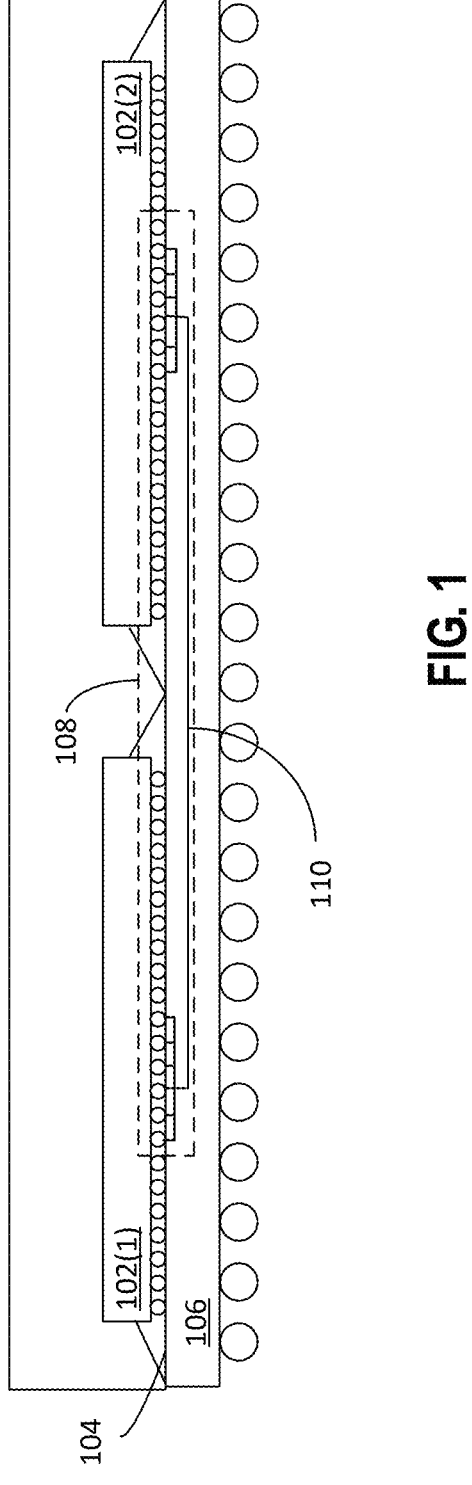
FIG. 1 is a side view of an exemplary integrated circuit (IC) package including two chiplets and a communication interface circuit which dynamically reconfigures redundant lanes between the two chiplets to increase redundancy when the probability of failure favors a particular communication direction, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include dynamically reconfigured redundant lanes in a communication interface circuit between chiplets to increase redundancy when the probability of failure favors a particular communication direction. Related apparatus and methods are also disclosed. In this regard, in some exemplary aspects disclosed herein, an integrated circuit (IC) package includes a processor-based system including a first chiplet, a second chiplet, and a communication interface circuit coupling the first and second chiplets. The communication interface circuit comprises main lanes (i.e., data lanes), also referred to as a main band, wherein a first portion of which communicates information from the first chiplet to the second chiplet (i.e., a first direction) and wherein a second portion of which communicates information from the second chiplet to the first chiplet (i.e., a second direction). The communication interface circuit also comprises a plurality of redundant lanes wherein each of the redundant lanes is dynamically configurable to communicate in one of the first and second directions. The communication interface circuit is configured to determine a failure in one of the main lanes which is allocated to communicate data in the first direction. In response to the failure in the one of the main lanes allocated to communicate data in the first direction, the communication interface circuit is configured to reconfigure one of the plurality of redundant lanes allocated to communicate in the second direction to communicate data intended for the one of the plurality of main lanes in the first direction.

In this regard, by dynamically reconfiguring a redundant lane to communicate in one of the first and second directions, the processor-based system can provide increased redundancy without changing the fixed number of redundant lanes when a probability of failure favors a particular communication direction. The probability of failure favors a particular communication direction when workloads running on the chiplets favor communication flow in the same particular direction. For example, one chiplet is a processing unit and the other chiplet is an accelerator, and the workload running on these chiplets favors the flow of information from the accelerator to the processing unit. As such, the probability of failure of the main band lanes in the direction from the accelerator to the processing unit is greater than the probability of failure of the main band lanes in the direction from the processing unit to the accelerator. Correspondingly, more than half of the redundant lanes including all the redundant lanes can be reconfigured to support the errors in the main lanes which were intended to communicate between the accelerator and the processing unit as errors in the main lanes occur.

In this regard, FIG. 1 is a side view of an exemplary IC package 100 including two chiplets and a communication interface circuit which dynamically reconfigures redundant lanes between the two chiplets to increase redundancy when the probability of failure favors a particular communication direction, according to some aspects. In this example, first and second dies 102(1), 102(2) are coupled to a first side 104 of a package substrate 106. For example, the first and second dies 102(1), 102(2) can be discrete, modular dies that are chiplets coupled to the package substrate 106 and electrically coupled to each other using a communication interface circuit 108 which includes die-to-die connections 110 provided through the package substrate 106. The dies 102(1), 102(2) as chiplets can include circuitry that is specific to a task or functionality, as opposed to, for example, a system-on-a-chip (SoC) that includes multiple systems and functions on a single, monolithic die. As process node continues to scale and die size increases, reducing the cost of yield loss becomes more challenging. Thus, by breaking a large monolithic die into chiplets, such as the dies 102(1), 102(2), cost due to yield loss is reduced. Chiplets can facilitate an IC package's faster time to market as chiplets allow already proven and tested dies to be integrated with other chiplets in the IC package. Chiplets also allow for dies, such as the dies 102(1), 102(2), from different manufacturers to be integrated together in the same package for heterogeneous integration, such as in the IC package 100. Using chiplets in an IC package, including the IC package 100, also facilitates the ability to use fabrication technologies and processes of choice to fabricate the first and second dies 102(1), 102(2) as either from the same or different technology nodes.

For example, the first die 102(1) as a chiplet may be fabricated using a first technology node, and the second die 102(2) as a chiplet may be fabricated using a second technology node that is not as advanced as the first technology node. In such an example, the first die 102(1) may include components (e.g., interconnects, transistors) that have a first minimum size, and the second die 102(2) may include components (e.g., interconnects, transistors) that have a second minimum size, where the second minimum size is greater than the first minimum size. In some implementations, the first and second dies 102(1), 102(2) may be fabricated using the same technology node or different technology nodes.

Figure 2:
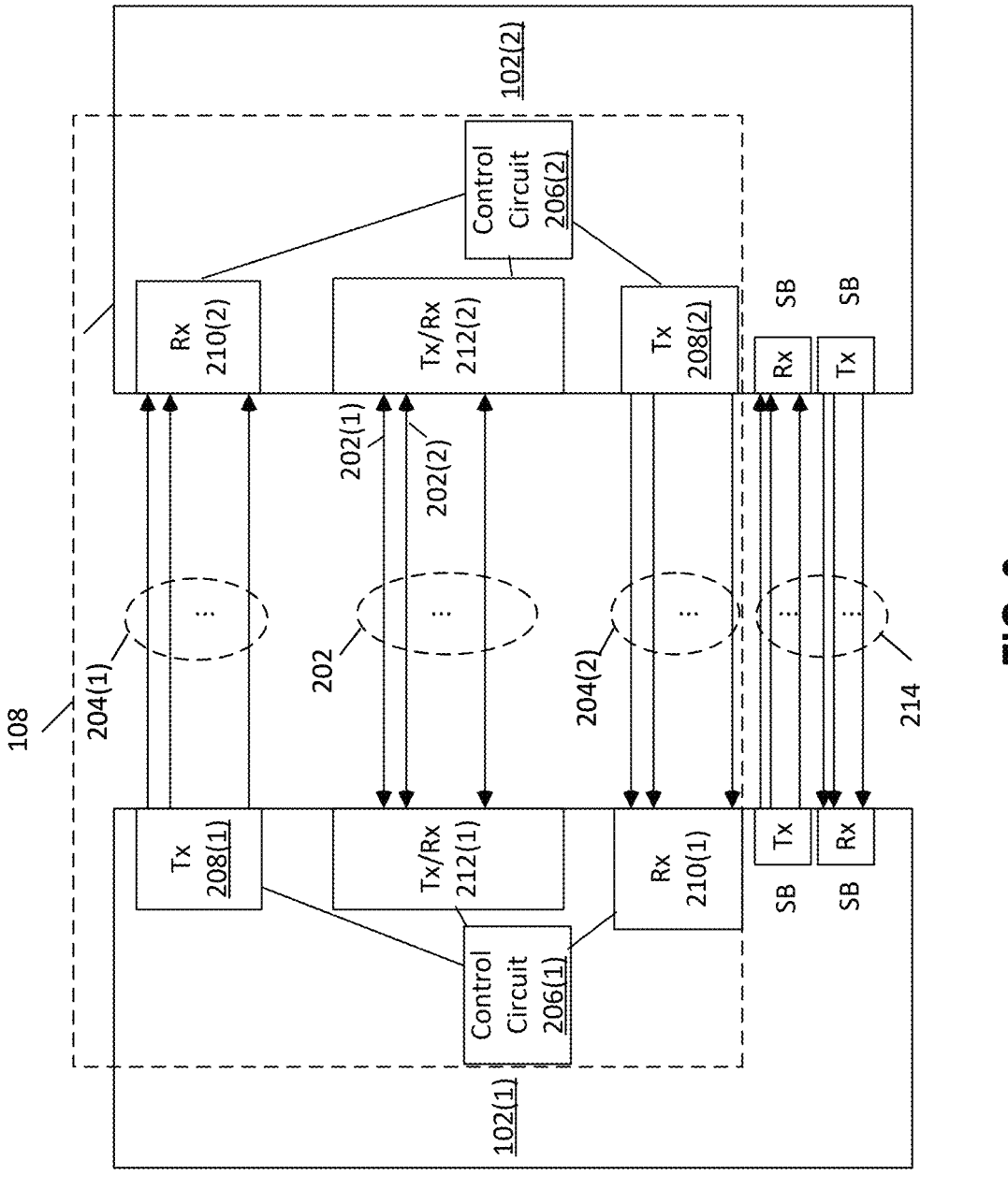
FIG. 2 is a block diagram of the two chiplets and the communication interface circuit in FIG. 1 having dynamically reconfigured redundant lanes between the two chiplets to increase redundancy when the probability of failure favors a particular communication direction.

FIG. 2 is a block diagram 200 of the two chiplets 102(1), 102(2) and the communication interface circuit 108 in FIG. 1 having dynamically reconfigured redundant lanes 202 between the two chiplets 102(1), 102(2) to increase redundancy when the probability of failure favors a particular communication direction. The first chiplet 102(1) is coupled to the second chiplet 102(2) through the communication interface circuit 108. The communication interface circuit 108 includes redundant lanes 202 and main lanes 204(1), 204(2). The main lanes 204(1) are allocated to communicate data from the first chiplet 102(1) to the second chiplet 102(2) (i.e., a first direction). The main lanes 204(2) are allocated to communicate data from the second chiplet 102(2) to the first chiplet 102(1) (i.e., a second direction). Each of the redundant lanes 202 is dynamically reconfigurable to communicate data in one of the first direction and the second direction on a failure of any one of the main lanes 204(1), 204(2). When any of the redundant lanes 202 are reconfigured to communicate in another direction, those redundant lanes remain configured to communicate in the other direction until they are re-trained or either of the chiplets 206(1), 206(2) are reset.

The communication interface circuit 108 also includes control circuits 206(1), 206(2) which initialize and configure main band transmitter circuits 208(1), 208(2), main band receiver circuits 210(1), 210(2), and redundant transceiver circuits 212(1), 212(2). The control circuits 206(1) and 206(2) also reconfigure the redundant transceiver circuits 212(1), 212(2) to transmit data in one of the first and second directions on an error in the main lanes 204(1), 204(2). Side lanes 214, also referred to as a side band, carry control information to ensure successful communication over the main lanes 204(1), 204(2) and the redundant lanes 202.

The control circuit 206(1) is configured to determine a failure in the main lanes 204(1) allocated to communicate in the first direction including errors in the transmitter circuits 208(1). In response to the failure in the main lanes 204(1) allocated to communicate in the first direction, the control circuit 206(1) is further configured to reconfigure a first one 202(1) of the redundant lanes 202 allocated to communicate in the second direction to communicate data intended for one of the main lanes 204(1) in the first direction.

The control circuit 206(2) is configured to determine a failure in the main lanes 204(2) allocated to communicate in the second direction including errors in the transmitter circuits 208(2). In response to the failure in one of the main lanes 204(2) allocated to communicate in the second direction, the control circuit 206(2) is further configured to reconfigure a second one 202(2) of the redundant lanes 202 allocated to communicate in the first direction to communicate data intended for one of the main lanes 204(2) in the second direction.

The control circuit 206(2) is configured to determine a second failure in the main lanes 204(2) allocated to communicate in the second direction including errors in the transmitter circuits 208(2). In response to the second failure in one of the main lanes 204(2) allocated to communicate in the second direction, the control circuit 206(2) is further configured to reconfigure the first one 202(1) of the plurality of redundant lanes 202 to communicate data intended for the second one of the plurality of main lanes 204(2) in the second direction.

The number of redundant lanes 202 is fixed. For an advanced package, the number of redundant lanes 202 is eight and the number of main lanes is sixty-four, thirty-two allocated to communicate in the first direction and thirty-two allocated to communicate in the second direction. Due to the aspects described above, when the data favors flowing in one direction and, correspondingly, the probability of failures on the main lanes increase in that direction, the redundant lanes can be configured as errors occur in that direction to support the higher probability of error. In this way, up to all eight of the redundant lanes can be utilized to support the same direction of data flow. Unlike this aspect, conventional approaches, such as the universal chiplet interface (UCIe), fixedly configure the redundant lanes so that half of the redundant lanes can only communicate in the first direction and the other half of the redundant lanes can only communicate in the second direction. In a conventional chiplet-to-chiplet interface, no more than half the number of redundant lanes can be allocated to any one direction which severely limits workload between chiplets that changes over time such as workloads addressing advanced driver assistance system (ADAS) applications.

Returning to FIG. 2, the control circuit 206(2) is configured to determine a number of lane failures in the main lanes 204(2) allocated to communicate in the second direction wherein the number of lane failures is greater than half of the fixed number of the plurality of redundant lanes 202 and less than or equal to the fixed number of the plurality of redundant lanes 202. For example, when the fixed number of the redundant lanes 202 is eight, the control circuit 206(2) can back up data flow for up to eight failures in the main lanes 204(1) or up to eight failures in the main lanes 204(2). In general, the eight failures can be any combination of failures between failures in the main lanes 204(1), 204(2) in the first direction and failures in the second direction. To this end, greater flexibility is provided by dynamically reconfiguring the direction of a redundant lane which can back up either a main lane selected from the main lanes 204(1) or selected from the main lanes 204(2). An exemplary circuit for a redundant lane backing up a main lane selected from the main lanes 204(1) and from the main lanes 204(2) will be discussed in connection with FIG. 4.

In response to the number of lane failures in the main lanes 204(2) allocated to communicate in the second direction, the control circuit 206(2) is further configured to reconfigure the same number of the plurality of redundant lanes 202 as the number of lane failures to communicate data in the second direction.

In another embodiment, the control circuit 206(1) is configured to determine a first number of lane failures in the main lanes 204(1) allocated to communicate in the first direction, and the control circuit 206(2) is configured to determine a second number of lane failures in the main lanes 204(2) allocated to communicate in the second direction. The fixed number of the redundant lanes 202 equals the first number of lane failures added to the second number of lane failures.

In response to the first number of lane failures in the main lanes 204(1) allocated to communicate in the first direction, the control circuit 206(1) is further configured to reconfigure a first portion of the redundant lanes 202 to communicate data in the first direction, wherein the first portion of the redundant lanes equals the first number of lane failures in the main lanes 204(1). In response to the second number of lane failures in the main lanes 204(2) allocated to communicate in the second direction, the control circuit 206(2) is further configured to reconfigure a second portion of the redundant lanes 202 to communicate data in the second direction, wherein the second portion of the of redundant lanes 202 equals the second number of lane failures in the main lanes 204(2).

FIG. 3 is a flowchart illustrating an exemplary process 300 of dynamically reconfiguring redundant lanes in a communication interface circuit between two chiplets to increase redundancy when the probability of failure favors a particular communication direction including, but not limited to, the chiplets and communication interface circuit in FIGS. 1 and 2. For the sake of clarity, elements of FIG. 2 are referenced in describing FIG. 3. It is to be understood that some aspects may provide that some operations illustrated in FIG. 3 may be performed in an order other than that illustrated herein and/or may be omitted.

In this regard, a first exemplary step of dynamically reconfiguring redundant lanes in a communication interface circuit between two chiplets to increase redundancy when the probability of failure favors a particular communication direction in the process 300 of FIG. 3 can include providing a first chiplet 102(1) (block 302, FIG. 3). The next step in the process 300 can include coupling a second chiplet 102(2) to the first chiplet 102(1) through a communication interface circuit 108. The communication interface circuit 108 comprises a plurality of main lanes 204 comprising a first subset 204(1) of the plurality of main lanes 204 allocated to communicate information in a first direction and a second subset 204(2) of the plurality of main lanes 204 allocated to communicate information in a second direction and a plurality of redundant lanes 202, each of the plurality of redundant lanes 202 dynamically reconfigurable to communicate in one of the first direction and the second direction (block 304, FIG. 3).

The next step in the process 300 can include determining a failure in a first one of the plurality of main lanes 204(1) allocated to communicate in the first direction (block 306, FIG. 3). The next step in the process 300 can include, in response to the failure in the first one of the plurality of main lanes 204(1) allocated to communicate in the first direction, reconfiguring a first one of the plurality of redundant lanes 202 allocated to communicate in the second direction to communicate data intended for the first one of the plurality of main lanes 204(1) in the first direction (block 308, FIG. 3).

Figure 4:
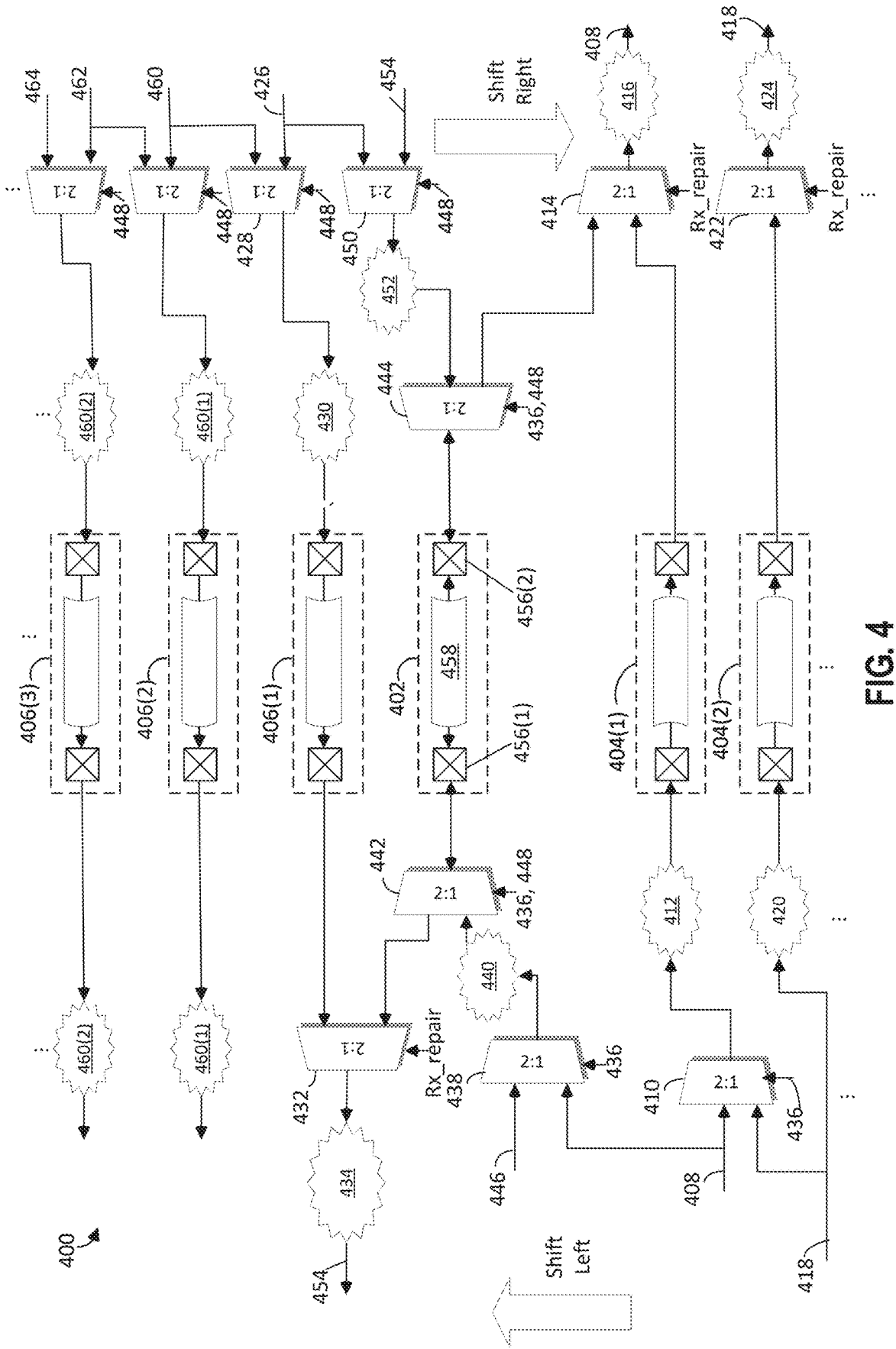
FIG. 4 is a circuit diagram of a portion of the exemplary communication interface circuit in FIGS. 1 and 2.

To further describe operations of the communication interface circuit 108 of FIGS. 1 and 2 and, in particular, the main band transmitter circuits 208(1), 208(2), main band receiver circuits 210(1), 210(2), and redundant transceiver circuits 212(1), 212(2), FIG. 4 is a circuit diagram of a portion 400 of the exemplary communication interface circuit 108 in FIGS. 1 and 2. Common elements between the communication interface circuit 108 in FIG. 2 and circuit diagram in FIG. 4 are shown with common element numbers.

For simplicity and clarity, FIG. 4 illustrates a portion 400 of the exemplary communication interface circuit 108 where one redundant lane 402 of the redundant lanes 202 backs up data flow from the main lanes 204(1), such as main lanes 404(1), 404(2) allocated to transmit in the first direction and the main lanes 204(2), such as main lanes 406(1), 406(2), and 406(3) allocated to transmit data in the second direction. During normal operation (e.g., no errors in the main lanes 204(1)) of transmission in the first direction from chiplet 102(1) to chiplet 102(2), data 408 passes in the first direction from chiplet 102(1) through a 2:1 multiplexer 410 and main band transmitter circuit 412 which is one of the main band transmitter circuits 208(1). The main band transmitter circuit 412 transmits the data 408 over main lane 404(1) to pass through a 2:1 multiplexer 414 and through main band receiver circuit 416 which is one of the main band receiver circuits 210(2) in chiplet 102(2) so that the data 408 can be processed by the chiplet 102(2).

Similarly, during normal operation (e.g., no errors in the main lanes 204(1)) of transmission in the first direction from chiplet 102(1) to chiplet 102(2), data 418 passes in the first direction from chiplet 102(1) through main band transmitter circuit 420 which is one of the main band transmitter circuits 208(1). The main band transmitter circuit 420 transmits the data 418 over main lane 404(2) to pass through a 2:1 multiplexer 422 and through main band receiver circuit 424 which is one of the main band receiver circuits 210(2) in chiplet 102(2) so that the data 418 can be processed by the chiplet 102(2).

When data is being passed in the second direction from chiplet 102(2) to chiplet 102(1), during normal operation (e.g., no errors in the main lanes 204(2)) of transmission, data 426 passes in the second direction from chiplet 102(2) through a 2:1 multiplexer 428. Main band transmitter circuit 430 which is one of the main band transmitter circuits 208(2) transmits the data 426 over main lane 406(1) to pass through a 2:1 multiplexer 432 and through main band receiver circuit 434 which is one of the main band receiver circuits 210(0) in chiplet 102(1) so that the data 426 can be processed by the chiplet 102(1).

The redundant lane 402 backs up both main lanes 204(1) including main lanes 404(1), 404(2) and the main lanes 204(2) including main lanes 406(1), 406(2), and 406(3). As an example, the control circuit 206(1) determines if the main lane 404(1) is in error. The main lane 404(1) can also be considered in error if the main band transmitter circuit 412 is not operable. When the main lane 404(1) is in error, the control circuit 206(1) generates a Tx_repair signal 436 which controls multiplexers 410, 438 so that the data 408 passes through the multiplexer 438 and is transmitted by redundant transceiver circuit 440 which is one of redundant transceiver circuits 212(1) to a tri-state device 442. The tri-state device 442 which is controlled by the Tx_repair signal 436 routes the data 408 over the redundant lane 402 to the chiplet 102(2) through a tri-state device 444 which is also controlled by the Tx_repair signal 436. In this case, the tri-state device 444 routes data to the 2:1 multiplexer 414 to the main band receiver circuit 416. Conventional shifting techniques are used to reconfigure data lines and renumber data line so that a redundant lane can back up any particular main lane. Whenever data for a main lane from main lanes 204(1) is backed up over a redundant lane data, the control circuit 206 reconfigures and renumbers a main lane such that a previously numbered main lane is shifted left to the next 2:1 multiplexer coupling main lanes 204(1). For simplicity, transmit data 446 represents any data that is intended to be sent over any of main lanes 208(1). Transmit data 446 is selected to show which data is selected for transmission over redundant lane 402 and data 408 is one example that is coupled to the 2:1 multiplexer 438.

The following is an example of when the redundant lane 402 backs up an error in the main lanes 204(2). For example, when main lane 406(1) is in error, the control circuit 206(2) generates a Tx_repair signal 448 which controls multiplexers 428, 450 so that the data 426 passes through the multiplexer 450 and is transmitted by redundant transceiver circuit 452 which is one of redundant transceiver circuits 212(2) to the tri-state device 444. The tri-state device 444 which is also controlled by the Tx_repair signal 448 routes the data 426 over the redundant lane 402 to the chiplet 102(1) through the tri-state device 442 which is also controlled by the Tx_repair signal 448. In this case, the tri-state device 442 routes data to the 2:1 multiplexer 432 to the main band receiver circuit 434. For simplicity, transmit data 454 represents any data that is intended to be sent over any of main lanes 208(2) but due to a respective link failure in a main lane is carried over redundant lane 402. Transmit data 454 is selected to show which data is selected for transmission over redundant lane 402 and data 426 is one example that is coupled to the 2:1 multiplexer 450. Whenever data for a main lane from main lanes 204(2) is backed up over a redundant lane, control circuit 206, utilizing known shifting techniques, reconfigures and renumbers a main lane from 204(2) such that a previously numbered main lane is shifted left to the next 2:1 multiplexer coupling main lanes 204(2).

Each one of the redundant lanes 202 can back up data flow from any and all of the main lanes 204(1), 204(2). Another way to accomplish this, in addition to the data 446 and 454 above, is for the multiplexer 438 to be a m:1 multiplexer where m is the number of main lanes 204(1) allocated in the first direction, and for the multiplexer 450 to be a n:1 multiplexer where n is the number of main lanes 204(2) allocated in the second direction.

Each of the lanes 402, 404(1), 404(2), and 406(1), 406(2), and 406(3) have metal bumps which are disposed on a metal trace, such as bumps 456(1), 456(2) disposed on the chiplets 102(1) and 102(2), respectively, and coupled through a metal trace 458. Chiplet 102(2) also transmits data to chiplet 102(1) over main band transmit circuits 460(1), 460(2) and main lanes 406(2), 406(3), respectively. Chiplet 102(1) also receives data from chiplet 102(1) over main band receive circuits 462(1), 462(2) and main lanes 406(2), 406(3), respectively.

Figure 5:
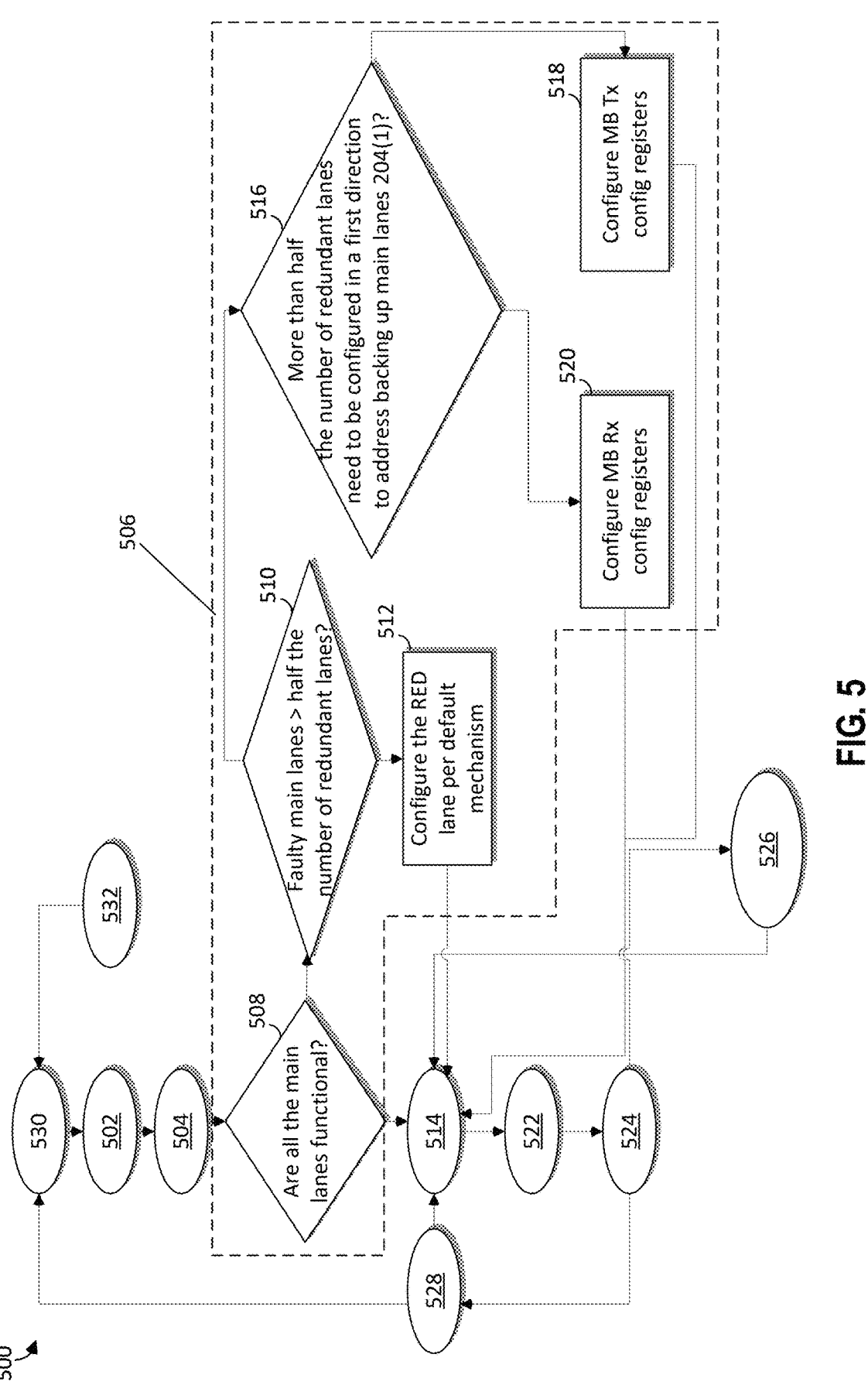
FIG. 5 is a state diagram for the operation of the communication interface circuit in FIG. 2 for determining whether one or more of the main lanes in FIG. 2 has a lane failure.

FIG. 5 is a state diagram 500 for the operation of the control circuits 206(1), 206(2) in FIG. 2 for determining whether one or more of the main lanes in FIG. 2 have a lane failure. The state diagram 500 will be discussed where package 100 utilizes an enhancement to conventional advanced packaging technology. Conventional advanced packaging technology is used for performance optimized applications with a short channel length, a distance between the chiplets 206(1), 206(2). The channel length is around 2 millimeters. Conventional advanced packaging technology has sixty-four main lanes and eight redundant lanes where half of the redundant lanes are dedicated to backing up main lanes allocated to the first direction and half of the redundant lanes are dedicated to backing up main lanes allocated to the second direction. As such, conventional advanced packaging technology does not allow re-configuring any of the eight redundant lanes to back up main lanes allocated to the first direction and main lanes allocated to the second direction.

The names of the states in the state diagram 500 are the names used in conventional advanced packaging technology and enhancements to those known states will be described below.

During initialization of the communication interface circuit 108, the side band lanes 214 are initialized at side band initialization (SBINIT) state 502. Upon completion of initialization of the SBINIT state 502, main band initialization (MBINIT) state 504 initializes the main lanes 204(1), 204(2). During the MBINIT state 504, parameters governing the communication on the main lanes 204(1), 204(2) including clock parameters, whether a particular lane is functional, and whether to repair a non-functional lane are exchanged between the chiplets 102(1), 102(2). Upon completion of the MBINIT state 504, repair main band (RepairMB) state 506, among other things, determines whether to configure one or more redundant lanes 202 to carry future data intended for one or more main lanes 204(1), 204(2). At stage 508 of the RepairMB state 506, the control circuit 206 determines if all the main lanes 204(1), 204(2) are functional. If any of the main lanes are not functional, stage 508 proceeds to stage 510 where the control circuit 206(1), 206(2) determines whether the current number of lane failures is greater than half the number of redundant lanes, such as four in conventional advanced packaging technology. If the current number of lane failures is not greater than half the number of redundant lanes, stage 510 proceeds to stage 512 where the control circuit 206(1), 206(2) configures a redundant lane per a default mechanism described in conventional advanced packaging technology. After configuring the redundant lane per the default mechanism, stage 512 proceeds to the main lane training (MBTRAIN) state 514. If the current number of lane failures is greater than half the number of redundant lanes, stage 510 proceeds to stage 516 where the control circuit 206(1), 206(2) determines whether more than half the number of redundant lanes need to be configured in a first direction to address backing up main lanes 204(1). If so, stage 516 proceeds to stage 518 where the control circuit 206(1), 206(2) configures main lane transmit (MB Tx) configuration registers to set the communication direction of redundant lane to the first direction to back up the lane failure in the main lanes 204(1). If not, stage 516 proceeds to stage 520 where control circuit 206 configures main lane receive (MB Rx) configuration registers to set the communication direction of a redundant lane to the second direction to back up the lane failure in the main lanes 204(2). The configuration registers will be discussed in connection with FIG. 6.

Stages 518 and 520 proceed to the MBTRAIN state 514 where the control circuit 206(1), 206(2) performs data training. In particular, the control circuit 206(1), 206(2) sets up the operational speed of the main lanes 204(1), 204(2) and perform clock to data centering on the main lane 204(1), 204(2). At high speeds, the control circuits 206(1), 206(2) perform additional calibrations. Upon completion, the MBTRAIN state 514 transitions to link initialization (LINK INIT) state 522. The LINK INIT state 522 exchanges raw die-to-die interface (RDI) link management messages between the chiplets 102(1) and 102(2). Upon completion, the LINK INIT state 522 transitions to ACTIVE state 524. During the ACTIVE state 524, data is transmitted over the active link whether that link is a main lane 204 or a redundant lane 202 carrying data intended for a main lane that is in lane failure. The ACTIVE state 524 may transition to a physical retrain (PHYRETRAIN) state 526 or lower power state (L1/L2) state 528. The ACTIVE state 524 transitions to the PHYRETRAIN state 526 when there is a link error. PHYSRETRAIN state 56 allows lane repair or link width degrade to happen from the Active state 524 without going for a complete link retrain sequence. The ACTIVE state 524 transitions to the L1/L2 state 528 when a chiplet, such as chiplets 102(1), 102(2), transitions to a lower power state. L1 is a low power state and L2 is a deep low power state. The PHYRETRAIN state 526 retrains and repairs a lane based on the type of link errors. Once repaired, the PHYRETRAIN state 526 transitions to the ACTIVE state 524. When a link is in the L1/L2 state 528, the link may transition to the ACTIVE state 524 or a RESET state 530 depending on the level of the low power state. The RESET state 530 begins the overall initialization process for the side band and main lanes. A TRAIN ERROR state 532 may be entered on uncorrectable internal errors of the communication interface circuit 108 and link down conditions on the side band lanes 214 or main lanes 204. The TRAIN ERROR state 532 is used as a transitional state due to any fatal or non-fatal events that need to bring the state machine back to RESET state. For example, a lane may transition to a TRAIN ERROR state 532 during initialization and training or if a "Start Universal Chiplet Interconnect Express (UCIe) Link training" bit from a UCIe Link control register is set when the state machine for a lane is not in RESET. It is also used for any events that transition a lane from a Link Up to a Link Down condition. During the TRAIN ERROR state 532, data, valid, clock, and track transmitters are tri-stated, and their receivers are permitted to be disabled.

Figure 6:
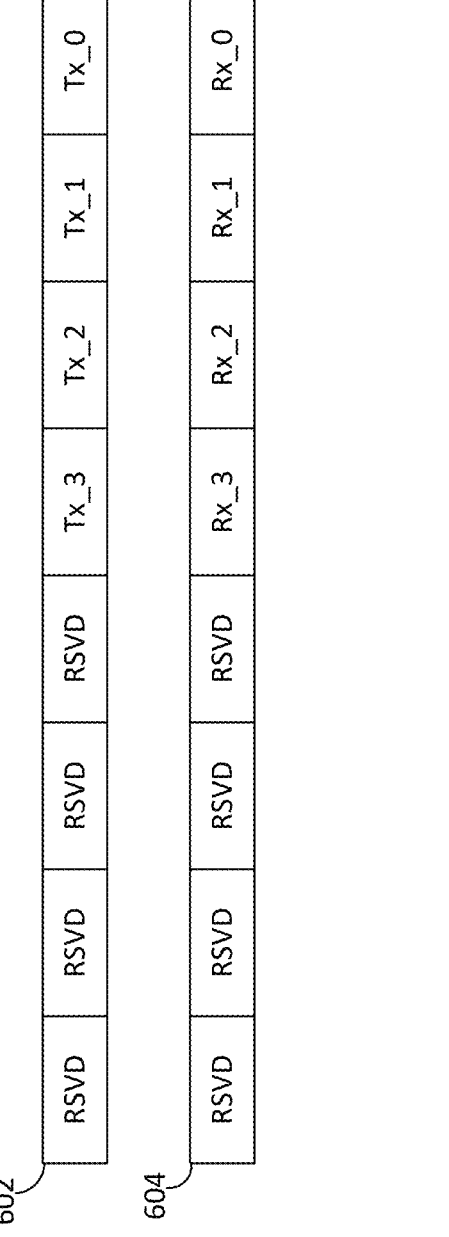
FIG. 6 is a block diagram of exemplary configuration registers configured to store a direction in which each of the plurality of redundant lanes in FIG. 2 is allocated to communicate.

FIG. 6 is a block diagram 600 of exemplary configuration registers to store a direction in which each of the plurality of redundant lanes in FIG. 2 are allocated to communicate. First direction configuration register 602, also referred to as MB_Tx_Config_reg, is an eight bit register to track the initial direction allocation of four redundant lanes of the redundant lanes 202. The four highest bit positions are reserved (RSVD) for future use. The four lowest bit positions 0-3 track the communication direction of four redundant lanes Tx_0, Tx_1, Tx_2, and Tx_3. The four redundant lanes Tx_0, Tx_1, Tx_2, and Tx_3 are initialized with values 1 indicating that they are allocated to back up the main lanes 204(1) which are allocated to carry data in the first direction.

Second direction configuration register 604, also referred to as MB_Rx_Config_reg, is an eight bit register to track the initial direction allocation of four redundant lanes of the redundant lanes 202. The four highest bit positions are reserved (RSVD) for future use. The four lowest bit positions 0-3 track the communication direction of four redundant lanes Rx_0, Rx_1, Rx_2, and Rx_3. The four redundant lanes Rx_0, Rx_1, Rx_2, and Rx_3 are initialized with values 1 indicating that they are allocated to back up the main lanes 204(2) which are allocated to carry data in the second direction. If during operation of the communication interface circuit 108, more than four redundant lanes are needed to back up the main lanes 204(1), five redundant lanes for example, one of the redundant lanes Rx_0, Rx_1, Rx_2, and Rx_3 will be reconfigured to carry data in the first direction and their respective bit position will be set to the value 0. Similarly, if during operation of the communication interface circuit 108, more than four redundant lanes are needed to back up the main lanes 204(2), five redundant lanes for example, one of the redundant lanes Tx_0, Tx_1, Tx_2, and Tx_3 will be reconfigured to carry data in the second direction and their respective bit position will be set to the value 0. In this way, the first and second direction configuration registers 602, 604 track the direction each redundant lane in the redundant lanes 202 is configured to carry data.

Figure 7:
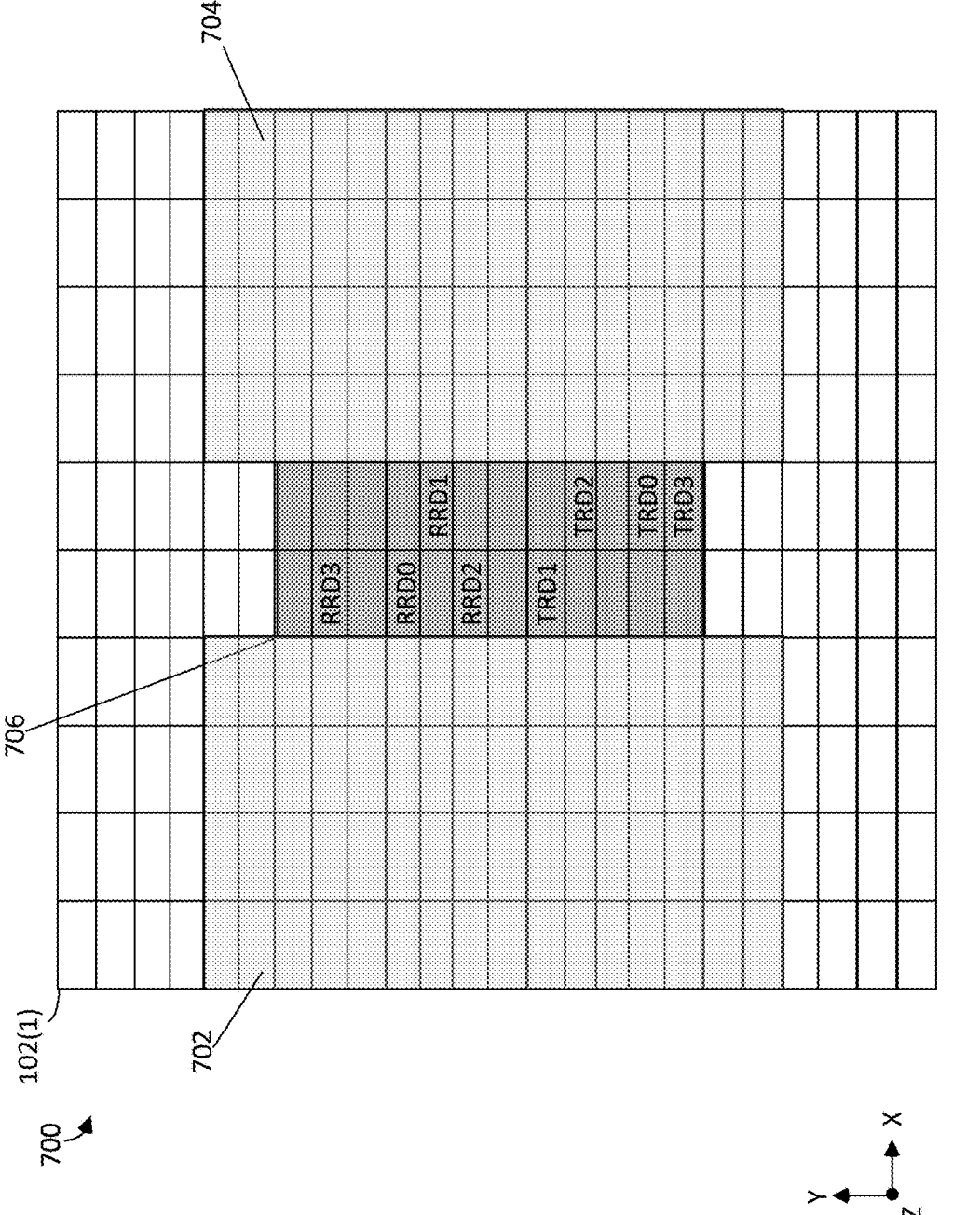
FIG. 7 is a physical layout of circuits in a chiplet from FIG. 2.

FIG. 7 is a physical layout 700 of circuits in a chiplet from FIG. 2. For convenience, the physical layout 700 will be discussed in connection to the chiplet 102(1). The physical layout 700 includes an area of main band transmit circuits 702, such as main band transmit circuit 412, 418, and an area of main band receive circuits 704, such as main band receive circuits 462(1), 462(2). The physical layout 700 also includes a central region 702. The central region 702 is defined to be located between main lane transmit circuits and main lane receive circuits. The redundant transceiver circuits 212(1) include redundant lane receiver circuits RRD0, RRD1, RRD2, and RRD3 and redundant lane transmitter circuits TRD0, TRD1, TRD2, and TRD3. The redundant transceiver circuits 212(1) are configured to transceive data over the redundant lanes 202. The redundant transceiver circuits 212(1) are physically located proximally to each other. Additionally, the redundant transceiver circuits 212(1) are deployed on the chiplet 102(1) and are physically located proximally at the center region 702 of the chiplet 102(1).

Figure 8:
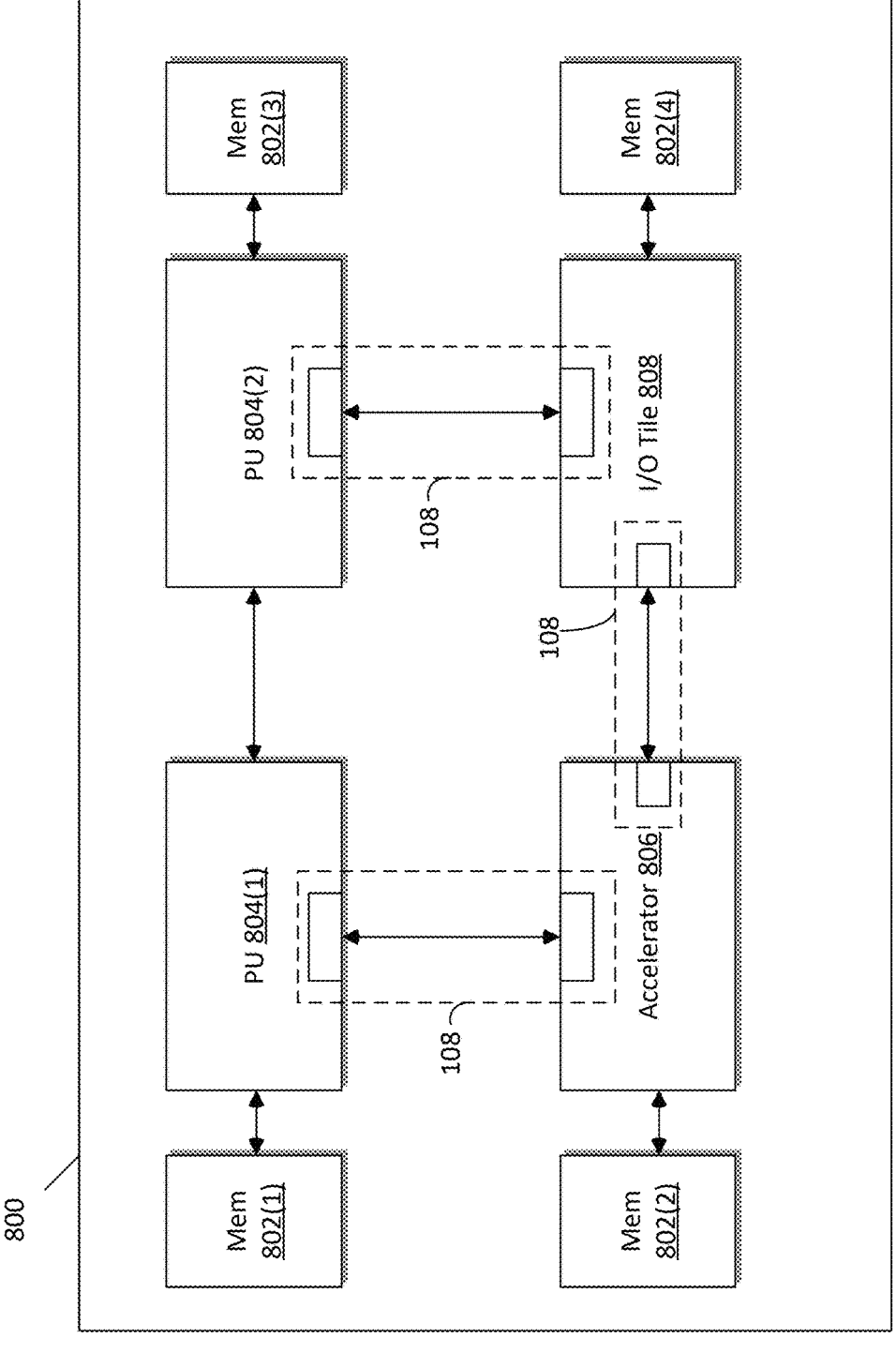
FIG. 8 is a block diagram of an exemplary IC package including multiple chiplets where more than two chiplets communicate with each other utilizing the communication interface circuit in FIG. 2.

FIG. 8 is a block diagram of an exemplary IC package 800 including multiple chiplets where more than two chiplets communicate with each other utilizing the communication interface circuit 108 in FIG. 2. The IC package 800 includes eight chiplets including memory chiplets 802(1)-802(4), processing unit chiplets 804(1), 804(2), an accelerator chiplet 806, and an I/O tile chiplet 808. The memory chiplets 802(1)-802(4) are dynamic random access memory (DRAM) dies. The processing unit chiplets 804(1), 804(2) are microprocessors which perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. The accelerator chiplet 806 is a specialized hardware die that is optimized to perform specific computations or tasks much faster and more efficiently than a general-purpose microprocessor or PU. The I/O tile chiplet 808 is a die whose function is to manage the inputs/outputs of the package 800. The PU chiplet 804(1) communicates with the accelerator chiplet 806 utilizing a communication interface circuit such as the communication interface circuit 108. The PU chiplet 804(1) communicates with the I/O tile chiplet 808 utilizing a communication interface circuit such as the communication interface circuit 108. The accelerator chiplet 806 communicates with the I/O tile chiplet 808 utilizing a communication interface circuit such as the communication interface circuit 108.

Electronic devices that include a processor-based system deployed in an IC package including two chiplets and a communication interface circuit which dynamically reconfigures redundant lanes between the two chiplets to increase redundancy when the probability of failure favors a particular communication direction as disclosed in aspects described herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 9:
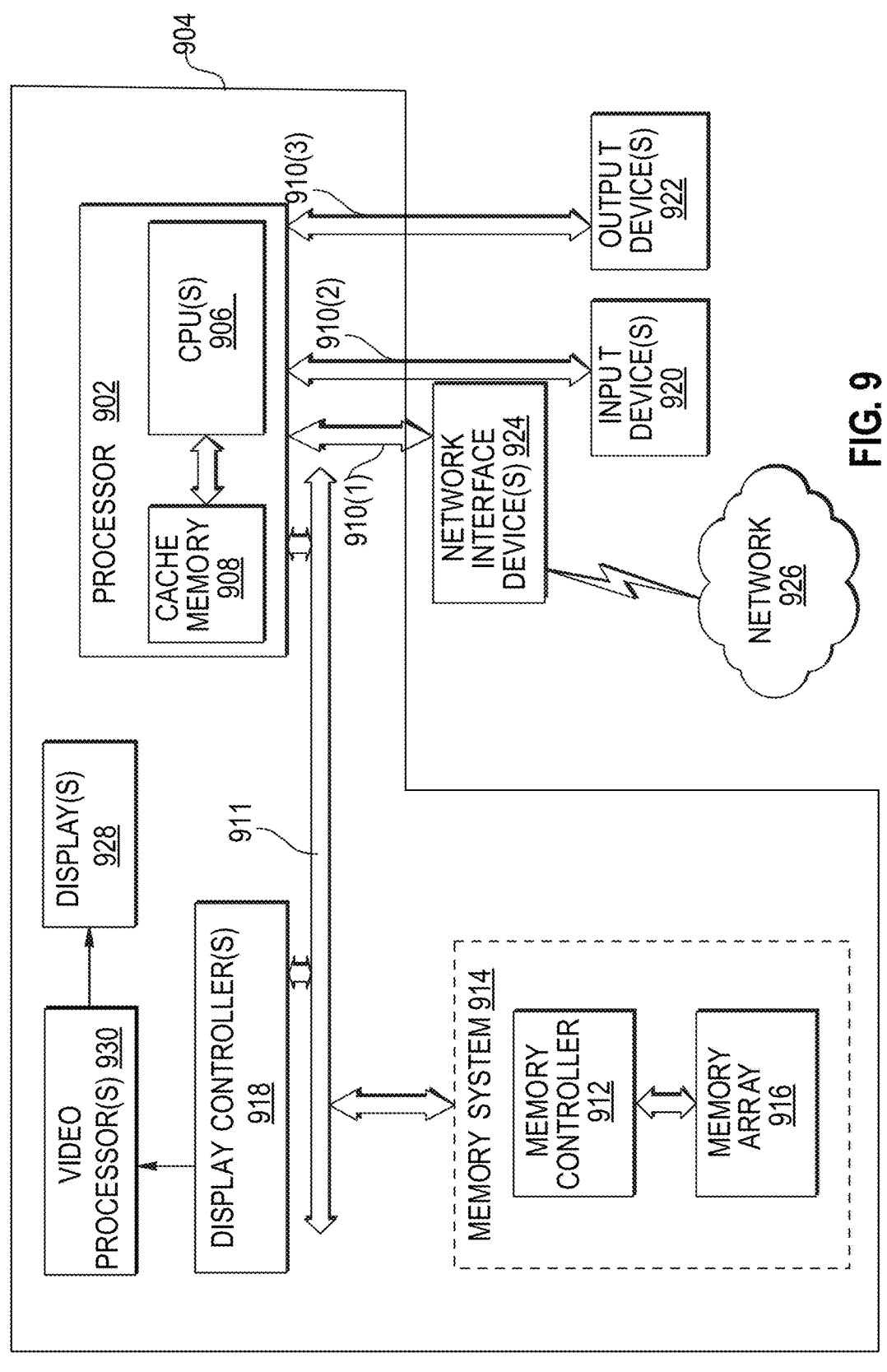
FIG. 9 is a block diagram of an exemplary processor-based system that can include an IC package including two chiplets and a communication interface circuit which dynamically reconfigures redundant lanes between the two chiplets to increase redundancy when the probability of failure favors a particular communication direction, including, but not limited to, the communication interface circuit in FIG. 2 and the exemplary embodiments in FIGS. 4-5, and according to the exemplary process in FIG. 3.

In this regard, FIG. 9 is a block diagram of an exemplary processor-based system 900 that can include an IC package including two chiplets and a communication interface circuit which dynamically reconfigures redundant lanes between the two chiplets to increase redundancy when the probability of failure favors a particular communication direction, including, but not limited to, the communication interface circuit in FIG. 2 and the exemplary embodiments in FIGS. 4-5, and according to the exemplary process in FIG. 3.

In this example, the processor-based system 900 is deployed utilizing multiple chiplets and communication interface circuits which dynamically reconfigure redundant lanes between the two chiplets to increase redundancy when the probability of failure favors a particular communication direction. A processor 902 and other devices may be deployed as a first chiplet 904. The processor 902 includes one or more central processing units (captioned as "CPUs" in FIG. 9) 906, which may also be referred to as CPU cores, processing units, or processor cores. The processor 902 may have cache memory 908 coupled to the processor 902 for rapid access to temporarily stored data. The processor 902 is coupled to communication interface circuits 910(1), 910(2), 910(3) and can intercouple devices deployed as chiplets included in the processor-based system 900. The processor 902 communicates with these devices by exchanging address, control, and data information over the communication interface circuits 910(1), 910(2), 910(3). The processor 902 is also coupled to a system bus 911 and can intercouple devices incorporated on the same chiplet 904 as processor. For example, the processor 902 can communicate bus transaction requests over system bus 911 to a memory controller 912, as an example of a client device. Although not illustrated in FIG. 9, multiple system buses 911 could be provided between any of the devices, wherein each bus 911 constitutes a different fabric.

Other devices can be connected to the system bus 911 and can communicate. As illustrated in FIG. 9, these devices can include a memory system 914 that includes the memory controller 912 and a memory array(s) 916, and display controllers 918. Devices deployed as separate chiplets such as one or more input devices 920, one or more output devices 922, and one or more network interface devices 924, can communicate with the processor 902 utilizing communication interface circuits 910(2), 910(3), and 910(1), respectively, as examples. The input device(s) 920 can include any type of input device, including but not limited to input keys, switches, voice processors, etc. The output device(s) 922 can include any type of output device, including, but not limited to, audio, video, other visual indicators, etc. The network interface device(s) 924 can be any device configured to allow exchange of data to and from a network 926. The network 926 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 924 can be configured to support any type of communications protocol desired.

The processor 902 may also be configured to access the display controller(s) 918 over the system bus 911, for example, to control information sent to one or more displays 928. The display controller(s) 918 sends information to the display(s) 928 to be displayed via one or more video processors 930, which process the information to be displayed into a format suitable for the display(s) 928. The display controller(s) 918 and/or the video processors 930 may comprise or be integrated into a GPU. The display(s) 928 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC) package, comprising:
   a communication interface circuit;
   a first chiplet; and
   a second chiplet coupled to the first chiplet through the communication interface circuit,
   the communication interface circuit comprising:
      a plurality of main lanes comprising a first subset of the plurality of main lanes allocated to communicate information in a first direction and a second subset of the plurality of main lanes allocated to communicate information in a second direction; and
      a plurality of redundant lanes, each of the plurality of redundant lanes dynamically reconfigurable to communicate in one of the first direction and the second direction,
      the communication interface circuit configured to determine a failure in a first one of the plurality of main lanes allocated to communicate in the first direction; and
      in response to the failure in the first one of the plurality of main lanes allocated to communicate in the first direction, the communication interface circuit further configured to reconfigure a first one of the plurality of redundant lanes to communicate data intended for the first one of the plurality of main lanes in the first direction.

2. The IC package of clause 1, wherein the first one of the plurality of redundant lanes was previously allocated to communicate in the second direction.

3. The IC package of clause 1, wherein the communication interface circuit is further configured to:
   determine a second failure in a second one of the plurality of main lanes allocated to communicate in the second direction; and
   in response to the second failure in the second one of the plurality of main lanes allocated to communicate in the second direction, reconfigure a second one of the plurality of redundant lanes allocated to communicate in the first direction to communicate data intended for the second one of the plurality of main lanes in the second direction.

4. The IC package of any of clauses 1-3, wherein the communication interface circuit is further configured to:
   determine to a third failure in a third one of the plurality of main lanes allocated to communicate in the second direction; and
   in response to the third failure in the third one of the plurality of main lanes allocated to communicate in the second direction, reconfigure the first one of the plurality of redundant lanes to communicate data intended for the third one of the plurality of main lanes in the second direction.

5. The IC package of clause 1, wherein the plurality of redundant lanes is a fixed number, wherein the communication interface circuit is further configured to:
   determine a number of lane failures in the plurality of main lanes allocated to communicate in the first direction wherein the number of lane failures is greater than half of the fixed number of the plurality of redundant lanes and less than or equal to the fixed number of the plurality of redundant lanes; and
   in response to the number of lane failures in the plurality of main lanes allocated to communicate in the first direction, reconfigure the same number of the plurality of redundant lanes as the number of lane failures to communicate data in the first direction.

6. The IC package of clause 1, wherein the plurality of redundant lanes is a fixed number, wherein the communication interface circuit is further configured to:
   determine a number of lane failures in the plurality of main lanes allocated to communicate in the second direction wherein the number of lane failures is greater than half of the fixed number of the plurality of redundant lanes and less than or equal to the fixed number of the plurality of redundant lanes; and
   in response to the number of lane failures in the plurality of main lanes allocated to communicate in the second direction, reconfigure the same number of the plurality of redundant lanes as the number of lane failures to communicate data in the second direction.

7. The IC package of any of clauses 1-6, wherein the communication interface circuit further comprises:
   configuration registers configured to store a direction in which each of the plurality of redundant lanes is allocated to communicate.

8. The IC package of any of clauses 1-7, wherein the communication interface circuit further comprises:
   a plurality of redundant transceiver circuits configured to transceive data over the plurality of redundant lanes, the plurality of redundant transceiver circuits physically located proximally to each other.

9. The IC package of clause 8, wherein the plurality of redundant transceiver circuits are deployed on a chiplet and are physically located proximally at a center region of the chiplet.

10. The IC package of any of clauses 1-9 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

11. A method of communicating between two chiplets in an integrated circuit (IC) package, comprising:
coupling a first chiplet to a second chiplet through a communication interface circuit,
the communication interface circuit comprising:
a plurality of main lanes comprising a first subset of the plurality of main lanes allocated to communicate information in a first direction and a second subset of the plurality of main lanes allocated to communicate information in a second direction; and
a plurality of redundant lanes, each of the plurality of redundant lanes dynamically reconfigurable to communicate in one of the first direction and the second direction;
determining a failure in a first one of the plurality of main lanes allocated to communicate in the first direction; and
in response to the failure in the first one of the plurality of main lanes allocated to communicate in the first direction,
reconfiguring a first one of the plurality of redundant lanes to communicate data intended for the first one of the plurality of main lanes in the first direction.

12. The method of clause 11, wherein the first one of the plurality of redundant lanes were previously allocated to communicate in the second direction.

13. The method of clause 11, further comprising:
determining a second failure in a second one of the plurality of main lanes allocated to communicate in the second direction; and
in response to the second failure in the second one of the plurality of main lanes allocated to communicate in the second direction,
reconfiguring a second one of the plurality of redundant lanes allocated to communicate in the first direction to communicate data intended for the second one of the plurality of main lanes in the second direction.

14. The method of any of clauses 11-13, further comprising:
determining to a third failure in a third one of the plurality of main lanes allocated to communicate in the second direction; and
in response to the third failure in the third one of the plurality of main lanes allocated to communicate in the second direction,
reconfiguring the first one of the plurality of redundant lanes to communicate data intended for the third one of the plurality of main lanes in the second direction.

15. The method of clause 11, wherein the plurality of redundant lanes is a fixed number, the method further comprising:
determining a number of lane failures in the plurality of main lanes allocated to communicate in the first direction wherein the number of lane failures is greater than half of the fixed number of the plurality of redundant lanes and less than or equal to the fixed number of the plurality of redundant lanes; and
in response to the number of lane failures in the plurality of main lanes allocated to communicate in the first direction, reconfiguring the same number of the plurality of redundant lanes as the number of lane failures to communicate data in the first direction.

16. The method of clause 11, wherein the plurality of redundant lanes is a fixed number, the method further comprising:
determining a number of lane failures in the plurality of main lanes allocated to communicate in the second direction wherein the number of lane failures is greater than half of the fixed number of the plurality of redundant lanes and less than or equal to the fixed number of the plurality of redundant lanes; and
in response to the number of lane failures in the plurality of main lanes allocated to communicate in the second direction,
reconfiguring the same number of the plurality of redundant lanes as the number of lane failures to communicate data in the second direction.

17. The method of any of clauses 11-16, wherein reconfiguring the first one of the plurality of redundant lanes further comprises:
storing a direction indication associated with the first one of the plurality of redundant lanes.

18. The method of any of clauses 11-17, further comprising:
deploying a plurality of redundant transceiver circuits physically proximate to each other in the first chiplet, the plurality of redundant transceiver circuits configured to transceive data over the plurality of redundant lanes.

19. The method of clause 18, wherein deploying the plurality of redundant transceiver circuits physically proximate to each other further comprises:
deploying the plurality of redundant transceiver circuits at a center region of the first chiplet.

20. An integrated circuit (IC) package, comprising:
a communication interface circuit;
a first chiplet; and
a second chiplet coupled to the first chiplet through the communication interface circuit,
the communication interface circuit comprising:
a plurality of main lanes comprising a first subset of the plurality of main lanes allocated to communicate information in a first direction and a second subset of the plurality of main lanes allocated to communicate information in a second direction; and
a plurality of redundant lanes, each of the plurality of redundant lanes dynamically reconfigurable to communicate in one of the first direction and the second direction, the plurality of redundant lanes is a fixed number;
the communication interface circuit configured to:
determine a first number of lane failures in the plurality of main lanes allocated to communicate in the first direction;
determine a second number of lane failures in the plurality of main lanes allocated to communicate in the second direction;
wherein the fixed number of the plurality of redundant lanes equals the first number of lane failures added to the second number of lane failures;
in response to the first number of lane failures in the plurality of main lanes allocated to communicate in the first direction, the communication interface circuit is further configured to reconfigure a first portion of the plurality of redundant lanes to communicate data in the first direction, wherein the first portion of the plurality of redundant lanes equals the first number of lane failures in the plurality of main lanes; and in response to the second number of lane failures in the plurality of main lanes allocated to communicate in the second direction, the communication interface circuit is further configured to reconfigure a second portion of the plurality of redundant lanes to communicate data in the second direction, wherein the second portion of the plurality of redundant lanes equals the second number of lane failures in the plurality of main lanes.

21. The IC package of clause 20, wherein the communication interface circuit further comprises:

configuration registers configured to store a direction in which each of the plurality of redundant lanes is allocated to communicate.

22. The IC package of clause 20 or 21, wherein the communication interface circuit further comprises:

a plurality of redundant transceiver circuits configured to transceive data over the plurality of redundant lanes, the plurality of redundant transceiver circuits physically located proximally to each other.

What is claimed is:

1. An integrated circuit (IC) package, comprising:
a communication interface circuit;
a first chiplet; and
a second chiplet coupled to the first chiplet through the communication interface circuit,
the communication interface circuit comprising:

a plurality of main lanes comprising a first subset of the plurality of main lanes allocated to communicate information in a first direction and a second subset of the plurality of main lanes allocated to communicate information in a second direction; and a plurality of redundant lanes, each of the plurality of redundant lanes dynamically reconfigurable to communicate in one of the first direction and the second direction, the communication interface circuit configured to determine a failure in a first one of the plurality of main lanes allocated to communicate in the first direction; and in response to the failure in the first one of the plurality of main lanes allocated to communicate in the first direction, the communication interface circuit further configured to reconfigure a first one of the plurality of redundant lanes to communicate data intended for the first one of the plurality of main lanes in the first direction.

2. The IC package of claim 1, wherein the first one of the plurality of redundant lanes was previously allocated to communicate in the second direction.

3. The IC package of claim 1, wherein the communication interface circuit is further configured to:

determine a second failure in a second one of the plurality of main lanes allocated to communicate in the second direction; and in response to the second failure in the second one of the plurality of main lanes allocated to communicate in the second direction, reconfigure a second one of the plurality of redundant lanes allocated to communicate in the first direction to communicate data intended for the second one of the plurality of main lanes in the second direction.

4. The IC package of claim 1, wherein the communication interface circuit is further configured to:

determine to a third failure in a third one of the plurality of main lanes allocated to communicate in the second direction; and in response to the third failure in the third one of the plurality of main lanes allocated to communicate in the second direction, reconfigure the first one of the plurality of redundant lanes to communicate data intended for the third one of the plurality of main lanes in the second direction.

5. The IC package of claim 1, wherein the plurality of redundant lanes is a fixed number, wherein the communication interface circuit is further configured to:

determine a number of lane failures in the plurality of main lanes allocated to communicate in the first direction wherein the number of lane failures is greater than half of the fixed number of the plurality of redundant lanes and less than or equal to the fixed number of the plurality of redundant lanes; and in response to the number of lane failures in the plurality of main lanes allocated to communicate in the first direction, reconfigure the same number of the plurality of redundant lanes as the number of lane failures to communicate data in the first direction.

6. The IC package of claim 1, wherein the plurality of redundant lanes is a fixed number, wherein the communication interface circuit is further configured to:

determine a number of lane failures in the plurality of main lanes allocated to communicate in the second direction wherein the number of lane failures is greater than half of the fixed number of the plurality of redundant lanes and less than or equal to the fixed number of the plurality of redundant lanes; and in response to the number of lane failures in the plurality of main lanes allocated to communicate in the second direction, reconfigure the same number of the plurality of redundant lanes as the number of lane failures to communicate data in the second direction.

7. The IC package of claim 1, wherein the communication interface circuit further comprises:

configuration registers configured to store a direction in which each of the plurality of redundant lanes is allocated to communicate.

8. The IC package of claim 1, wherein the communication interface circuit further comprises:

a plurality of redundant transceiver circuits configured to transceive data over the plurality of redundant lanes, the plurality of redundant transceiver circuits physically located proximally to each other.

9. The IC package of claim 8, wherein the plurality of redundant transceiver circuits are deployed on a chiplet and are physically located proximally at a center region of the chiplet.

10. The IC package of claim 1 integrated into a device selected from a group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

11. A method of communicating between two chiplets in an integrated circuit (IC) package, comprising:

coupling a first chiplet to a second chiplet through a communication interface circuit, the communication interface circuit comprising:

a plurality of main lanes comprising a first subset of the plurality of main lanes allocated to communicate information in a first direction and a second subset of the plurality of main lanes allocated to communicate information in a second direction; and a plurality of redundant lanes, each of the plurality of redundant lanes dynamically reconfigurable to communicate in one of the first direction and the second direction;

determining a failure in a first one of the plurality of main lanes allocated to communicate in the first direction; and in response to the failure in the first one of the plurality of main lanes allocated to communicate in the first direction, reconfiguring a first one of the plurality of redundant lanes to communicate data intended for the first one of the plurality of main lanes in the first direction.

12. The method of claim 11, wherein the first one of the plurality of redundant lanes were previously allocated to communicate in the second direction.

13. The method of claim 11, further comprising:

determining a second failure in a second one of the plurality of main lanes allocated to communicate in the second direction; and in response to the second failure in the second one of the plurality of main lanes allocated to communicate in the second direction, reconfiguring a second one of the plurality of redundant lanes allocated to communicate in the first direction to communicate data intended for the second one of the plurality of main lanes in the second direction.

14. The method of claim 11, further comprising:

determining to a third failure in a third one of the plurality of main lanes allocated to communicate in the second direction; and in response to the third failure in the third one of the plurality of main lanes allocated to communicate in the second direction, reconfiguring the first one of the plurality of redundant lanes to communicate data intended for the third one of the plurality of main lanes in the second direction.

15. The method of claim 11, wherein the plurality of redundant lanes is a fixed number, the method further comprising:

determining a number of lane failures in the plurality of main lanes allocated to communicate in the first direction wherein the number of lane failures is greater than half of the fixed number of the plurality of redundant lanes and less than or equal to the fixed number of the plurality of redundant lanes; and in response to the number of lane failures in the plurality of main lanes allocated to communicate in the first direction, reconfiguring the same number of the plurality of redundant lanes as the number of lane failures to communicate data in the first direction.

16. The method of claim 11, wherein the plurality of redundant lanes is a fixed number, the method further comprising:

determining a number of lane failures in the plurality of main lanes allocated to communicate in the second direction wherein the number of lane failures is greater than half of the fixed number of the plurality of redundant lanes and less than or equal to the fixed number of the plurality of redundant lanes; and in response to the number of lane failures in the plurality of main lanes allocated to communicate in the second direction, reconfiguring the same number of the plurality of redundant lanes as the number of lane failures to communicate data in the second direction.

17. The method of claim 11, wherein reconfiguring the first one of the plurality of redundant lanes further comprises:

storing a direction indication associated with the first one of the plurality of redundant lanes.

18. The method of claim 11, further comprising:

deploying a plurality of redundant transceiver circuits physically proximate to each other in the first chiplet, the plurality of redundant transceiver circuits configured to transceive data over the plurality of redundant lanes.

19. The method of claim 18, wherein deploying the plurality of redundant transceiver circuits physically proximate to each other further comprises:

deploying the plurality of redundant transceiver circuits at a center region of the first chiplet.

20. An integrated circuit (IC) package, comprising:

a communication interface circuit;

a first chiplet; and a second chiplet coupled to the first chiplet through the communication interface circuit, the communication interface circuit comprising:

a plurality of main lanes comprising a first subset of the plurality of main lanes allocated to communicate information in a first direction and a second subset of the plurality of main lanes allocated to communicate information in a second direction; and a plurality of redundant lanes, each of the plurality of redundant lanes dynamically reconfigurable to communicate in one of the first direction and the second direction, the plurality of redundant lanes is a fixed number;

the communication interface circuit configured to:

determine a first number of lane failures in the plurality of main lanes allocated to communicate in the first direction;

determine a second number of lane failures in the plurality of main lanes allocated to communicate in the second direction;

wherein the fixed number of the plurality of redundant lanes equals the first number of lane failures added to the second number of lane failures;

in response to the first number of lane failures in the plurality of main lanes allocated to communicate in the first direction, the communication interface circuit is further configured to reconfigure a first portion of the plurality of redundant lanes to communicate data in the first direction, wherein the first portion of the plurality of redundant lanes equals the first number of lane failures in the plurality of main lanes; and in response to the second number of lane failures in the plurality of main lanes allocated to communicate in the second direction, the communication interface circuit is further configured to reconfigure a second portion of the plurality of redundant lanes to communicate data in the second direction, wherein the second portion of the plurality of redundant lanes equals the second number of lane failures in the plurality of main lanes.

21. The IC package of claim 20, wherein the communication interface circuit further comprises:
configuration registers configured to store a direction in which each of the plurality of redundant lanes is allocated to communicate.

22. The IC package of claim 20, wherein the communication interface circuit further comprises:
a plurality of redundant transceiver circuits configured to transceive data over the plurality of redundant lanes, the plurality of redundant transceiver circuits physically located proximally to each other.

* * * * *